United States Patent
Monti et al.

(10) Patent No.: US 11,688,127 B2
(45) Date of Patent: Jun. 27, 2023

(54) APPARATUS AND METHOD FOR DATA AGGREGATION

(71) Applicant: Sony Interactive Entertainment Inc., Tokyo (JP)

(72) Inventors: Maria Chiara Monti, London (GB); Fabio Cappello, London (GB); Matthew Sanders, Hertfordshire (GB); Timothy Edward Bradley, London (GB); Oliver Hume, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/470,225

(22) Filed: Sep. 9, 2021

(65) Prior Publication Data

US 2022/0092846 A1   Mar. 24, 2022

(30) Foreign Application Priority Data

Sep. 18, 2020  (GB) ..................................... 2014735

(51) Int. Cl.
| | |
|---|---|
| *G06T 15/20* | (2011.01) |
| *A63F 13/26* | (2014.01) |
| *A63F 13/525* | (2014.01) |
| *G06F 3/01* | (2006.01) |

(52) U.S. Cl.
CPC .............. *G06T 15/20* (2013.01); *A63F 13/26* (2014.09); *A63F 13/525* (2014.09); *G06F 3/013* (2013.01)

(58) Field of Classification Search
CPC ........ G06T 15/20; A63F 13/26; A63F 13/525; G06F 3/013

USPC ............................................. 345/156; 463/31
See application file for complete search history.

(56) References Cited

U.S. PATENT DOCUMENTS

| | | | | |
|---|---|---|---|---|
| 6,241,609 | B1 * | 6/2001 | Rutgers .................. | G06F 16/40 463/31 |
| 10,639,557 | B2 * | 5/2020 | Hake ...................... | G06F 3/012 |
| 2014/0038708 | A1 * | 2/2014 | Davison ................. | A63F 13/69 463/31 |
| 2016/0283081 | A1 * | 9/2016 | Johnston .............. | H04N 13/398 |
| 2017/0192407 | A1 * | 7/2017 | Kurella ................. | G06F 3/0482 |
| 2017/0339372 | A1 * | 11/2017 | Valli .................... | G06T 15/005 |
| 2018/0224945 | A1 * | 8/2018 | Hardie-Bick ........... | G06F 3/016 |
| 2018/0293041 | A1 * | 10/2018 | Harviainen ............. | G06F 3/147 |

OTHER PUBLICATIONS

Extended European Search Report for corresponding EP Application No. 21195207.2, 9 pages, dated Feb. 11, 2022.
Combined Search Report and Examination Report for corresponding GB Application No. 2014735.1, 11 pages, dated Jun. 18, 2021.

* cited by examiner

*Primary Examiner* — Prabodh M Dharia
(74) *Attorney, Agent, or Firm* — Matthew B. Dernier, Esq.

(57) ABSTRACT

A data processing apparatus includes input circuitry to receive viewpoint data indicative of respective viewpoints for a plurality of spectators of a virtual environment, detection circuitry to detect a portion of the virtual environment viewed by each of the respective viewpoints in dependence upon the viewpoint data, selection circuitry to select one or more regions of the virtual environment in dependence upon at least some of the detected portions, and output circuitry to output data indicative of one or more of the selected regions.

20 Claims, 4 Drawing Sheets

APPARATUS AND METHOD FOR DATA AGGREGATION

BACKGROUND OF THE INVENTION

Field of the Disclosure

The present disclosure relates to apparatus and methods for data aggregation. In particular, the present disclosure relates to data processing apparatus and methods that use viewpoint data for a plurality of spectators of a virtual environment.

Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years there has been a significant increase in the popularity of electronic sports (e-sports) amongst both competitors and spectators. E-sports generally include computer games that are played competitively between two or more players or teams, and these games may be streamed live to an audience via television or an online portal (such as a video streaming website). Many e-sports events take the form of organized tournaments, featuring a multiplayer video game competition, especially between teams of players that may include both amateur and professional players. In some cases, a player of the game streams their own point of view such that spectators can have an insight into an individual player's experience, while in others a commentator may be provided to give an overview of the entire game in a manner analogous to traditional sports broadcasting or a spectator may control their own point of view.

In some arrangements, spectators (viewers) are able to interact with one another during the game via an associated chat room or the like which enables text inputs to be sent and received by each viewer. In some arrangements, spectators may also communicate by providing audio inputs. This can improve viewer enjoyment of the content, due to the increased engagement, as well as enable a deeper appreciation of the game through game analysis, tactical discussion, and player appreciation and the like.

In some arrangements, viewers are able to select from different viewpoints when spectating a game that is being played. For example, a viewer may be able to focus on a particular player (or player character), a particular objective, or a static/dynamic view of one or more portions of the in-game environment. In such cases, the chat feature described above may be advantageous in that it can be used to alert spectators to particular hotspots for action—this can lead to an improved user viewing experience, as it reduces the likelihood of them missing the action.

However, in such arrangements some spectators either may not pay attention to the chat feature, or may not engage with the chat feature at all, and may therefore be unaware of the action hotspots. Moreover, even when alerting a spectator to a particular hotspot via a text notification in a chat feature, the spectator may have difficulty understanding the in-game location of the action hotspot and may still miss the action. Similarly, in arrangements where a commentator provides commentary, the commentator may have difficulty in identifying a location of an action hotspot or deciding which action hotspot to direct their commentary to.

While video games have been discussed here, similar arrangements may be implemented in conjunction with more traditional video content—for example, a movie, a television episode, or a real-world sports game. As with the game content, these may be live (or provided with only a slight delay) or may be entirely pre-recorded. It is also considered that this may be extended to virtual recreations of real-world events (or other computer-rendered content)—for example, a computer-generated recreation of a sports match or a virtual television series.

It is in the context of the above arrangements that the presently disclosure arises.

SUMMARY OF THE INVENTION

It is to be understood that both the foregoing general description of the invention and the following detailed description are exemplary, but are not restrictive, of the invention.

In a first aspect, a data processing apparatus is provided in accordance with claim 1.

In another aspect, a system is provided in accordance with claim 18.

In another aspect, a method is provided in accordance with claim 19.

Further aspects and features of the present invention are defined in the appended claims and within the text of the accompanying description.

BRIEF DESCRIPTION OF THE DRAWINGS

The present technique will be described further, by way of example only, with reference to embodiments thereof as illustrated in the accompanying drawings, in which.

DESCRIPTION OF THE EMBODIMENTS

Figure 1:
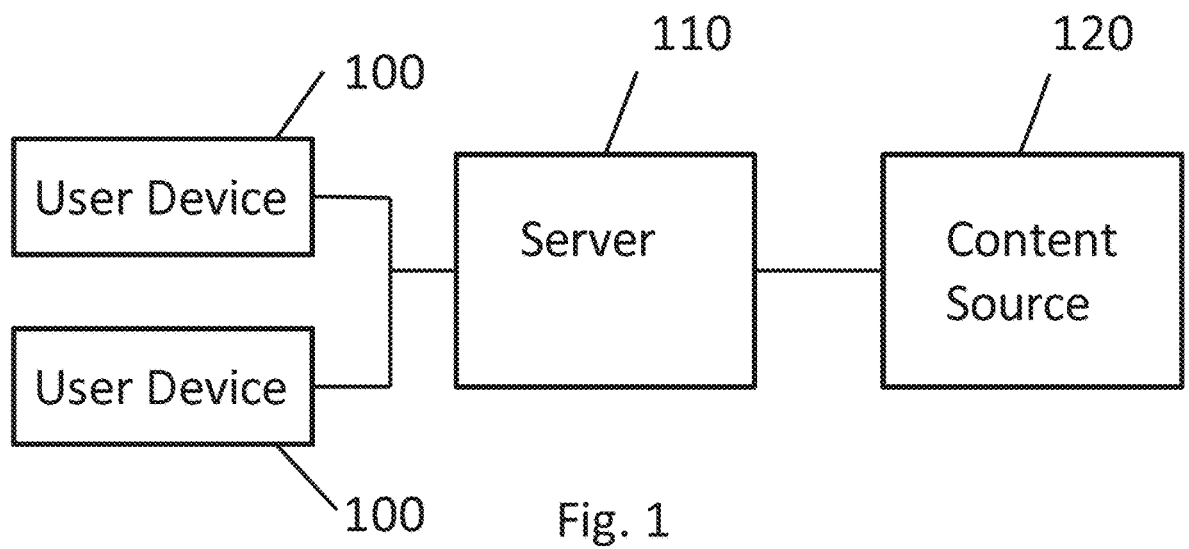
FIG. 1 is a schematic diagram illustrating an example of a content providing system.

Embodiments of the invention will now be described, by way of example only, with reference to the accompanying drawings, in which:

Referring now to the drawings, wherein like reference numerals designate identical or corresponding parts throughout the several views, FIG. 1 schematically illustrates an example of a content providing system that is suitable for providing images of a content, such as a video game, real-world sports game or a movie, to a spectator (viewer) and enabling the spectator to provide inputs, such as a control input for selecting or updating a viewpoint and/or a text input and/or an audio input, in response to the content. The content providing system comprises a plurality of user devices 100, one or more servers 110 and a content source 120. A user device 100 is provided locally with respect to a user and may be a personal computer, a mobile phone, a game console (such as the Sony® PlayStation 4® entertainment device), a smart television, a tablet or a set top box, for example. The user device 100 can be any device that is capable of communicating with the server 110 via any suitable network connection to receive data from the server 110 and to communicate data to the server 110. As discussed below, in some cases the user device 100 may include a display unit or the user device 100 may be connectable to a display device via a wired or wireless communication. Content such as a video game executed by a game server for an e-sports event played competitively between two or more players or teams can be streamed to the user devices 100 (client devices) for viewing by spectators. The number of spectating users viewing a content may vary from two to hundreds of even thousands, where each spectating user has a respective user device 100. As such, whilst FIG. 1 schematically illustrates a system including two user devices 100, the number of user device 100 may in some circumstances be of the order of tens, hundreds or even thousands.

In some examples, the user device 100 comprises a display unit to display one or more images to the user. Alternatively, the user device 100 may be configured to communicate with a display device (not shown in FIG. 1) via a wired or wireless communication (e.g. Wi-Fi® or Bluetooth® wireless link) to communicate image data to an associated display device for display to the spectating user. In some cases, the user device 100 is configured to communicate with a display device such as a head-mountable display unit (HMD) so as to communicate image data to the HMD worn by the spectating user for display to the spectating user. The configuration of the display device and the user device 100 may be determined freely as appropriate for a given implementation.

In some examples, the user device 100 comprises an input unit (e.g. one or more buttons, touch pad, one or more control sticks) for allowing the user to provide one or more user inputs, and the user device 100 is configured to communicate data indicative of the one or more user inputs to one or more of the servers 110. Alternatively or in addition, the user device 100 may be configured to communicate with a user input device (not shown in FIG. 1) such as a handheld controller (e.g. the Sony DualShock 4® controller) or a head-mountable display unit to receive data indicative of one or more user inputs provided by a user and communicate data indicative of at least some of the user inputs to one or more of the servers 110. The configuration of the input device and the user device 100 may be determined freely as appropriate for a given implementation.

The server 110 obtains content from the content source 120 (such as from a storage medium or an external broadcast) and provides the content to the user device, other arrangements are also considered suitable. For example, a content source may be a local storage medium (such as a hard drive or a disk), a digital broadcast, or another server unrelated to the server 110, such as a game server that received inputs from players for executing a video game. The server 110 can be configured to provide a video stream to one or more of the user devices 100. The server 110 may be configured to provide the video stream in a range of video formats suitable for the user devices 100. Further, the video stream may include frames configured for presentation to a user at a range of different frame rates suitable for the user devices 100.

Content such as a video game executed by a game server for an e-sports event played competitively between two or more players or teams can be streamed to user's devices (client devices) for viewing by spectators such that the spectators view a virtual environment associated with the content. In some examples, a number of spectators for a content may range from no viewing spectators to hundreds or even thousands of viewing spectators.

The arrangement shown in FIG. 1 is considered to be exemplary, and any suitable combination of devices that may be configured to provide content to a user to enable viewing of the content and to receive inputs from the user is considered appropriate in the context of this disclosure.

Figure 2:
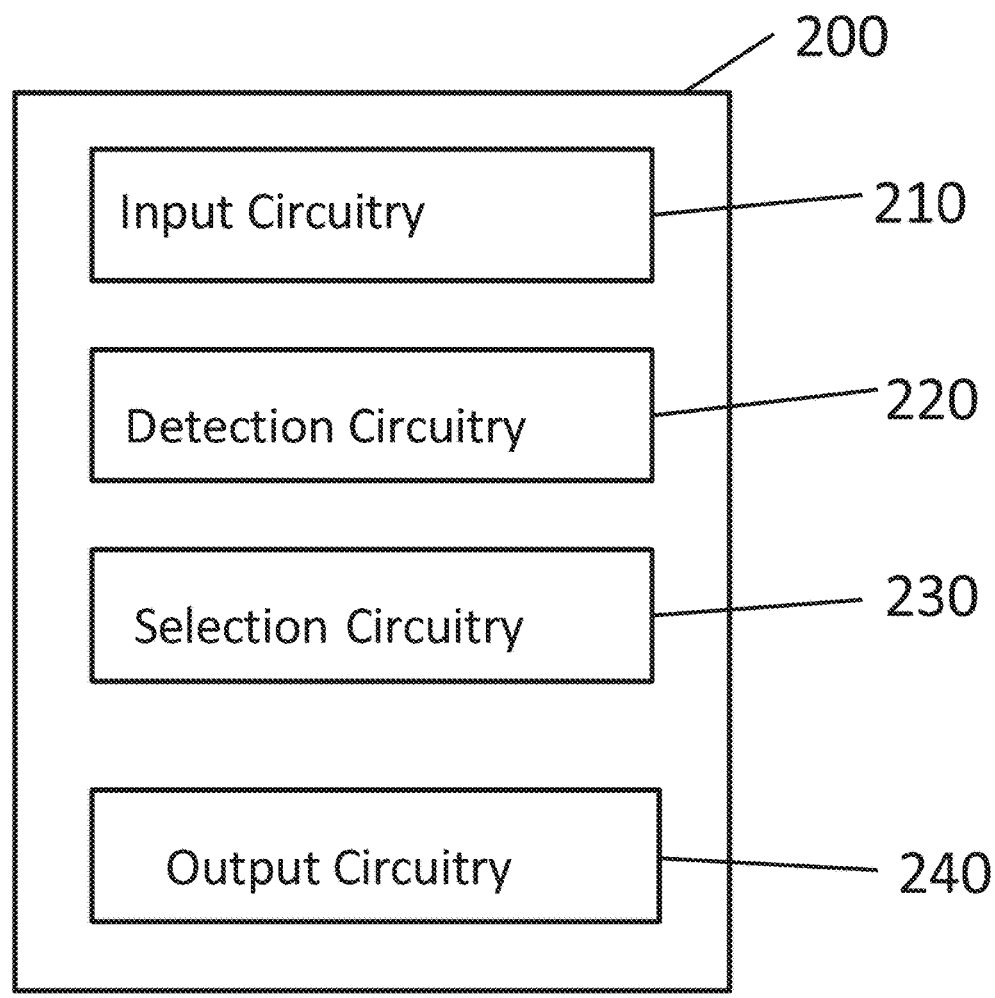
FIG. 2 is a schematic diagram illustrating a data processing apparatus.

FIG. 2 schematically illustrates a data processing apparatus 200 configured to receive viewpoint data for a plurality of spectators of a virtual environment, such as virtual environment for a video game or an animation or another content. In embodiments of the disclosure, the data processing apparatus 200 comprises: input circuitry 210 to receive viewpoint data indicative of respective viewpoints for a plurality of spectators of a virtual environment, detection circuitry 220 to detect a portion of the virtual environment viewed by each of the respective viewpoints in dependence upon the viewpoint data, selection circuitry 230 to select one or more regions of the virtual environment in dependence upon at least some of the detected portions, and output circuitry 240 to output data indicative of one or more of the selected regions.

The input circuitry 210 receives the viewpoint data for a plurality of spectators each viewing images of a same content having an associated virtual environment. As explained in more detail later, the input circuitry 210 can receive the viewpoint data for a plurality of spectators, where the plurality of the spectators may be a subset of the total number of spectators for the content. The viewpoint data defines one or more properties for a viewpoint for a respective spectator. The detection circuitry 210 detects a portion of the virtual environment viewed by a spectator in dependence upon the viewpoint data. Using the viewpoint data for the plurality of users, the detection circuitry 210 can therefore detect a plurality of portions of the virtual environment viewed by the plurality of spectators. Therefore, using the viewpoint data, the data processing apparatus 200 can select one or more regions of the virtual environment in dependence upon at least some of the portions of the virtual environment that are detected to be viewed by the spectators so as to select one or more regions that are of particular interest for the plurality of spectators. In this way, the data processing apparatus 200 can select one or more regions of the virtual environment and output data indicative of one or more of the selected regions.

As noted elsewhere herein, a portion of the virtual environment viewed by a spectator may correspond to a particular player or player character (for example, through the provision of a selectable virtual camera that tracks that particular player/character), a particular objective/target such as a goal or treasure chest, or a static or dynamic view of one or more parts of the in-game environment, or a region within that view for example within a predetermined radius of the centre of that view, and/or intersecting the centreline of that view. More generally, the portion may correspond to a locus of interest for the given spectator, with that locus being identified according to the manner in which the user views the virtual environment (e.g. if done by tagging a character/object to follow, then that character/object is the locus; if done by free view under the control of the user, then the resulting viewpoint, or a region within a threshold of the centre of that viewpoint, and/or within a threshold distance of that viewpoint, is the locus).

The data processing apparatus 200 receives viewpoint data for a plurality of spectators, where the plurality of spectators may be a subset of the spectators for the content or may include all of the spectators for the content. For example, the number of spectators watching a content, such as an e-sports event, may vary from a relatively small number of spectators (e.g. fewer than five spectators) to thousands of spectators. The input circuitry 210 can be configured to receive the viewpoint data for at least a subset of the spectators viewing the content. In the case where the number of spectators is relatively small (e.g. fewer than 20 spectators) the input circuitry 210 may be configured to receive viewpoint data for all of the spectators, whereas in the case where the number of spectators is of the order of hundreds or thousands it can be beneficial for the input circuitry 210 to acquire viewpoint data for a subset of the spectators. In particular, the data processing apparatus 200 outputs data indicative of one or more selected regions of interest in the virtual environment in dependence upon the acquired viewpoint data, and for cases where there are thousands of spectators, it is possible to identify one or more selected regions of interest by selecting a subset of the spectators and analysing the viewpoint data for a subset of the spectators instead of analysing the viewpoint data for each spectator. For example, the input circuitry 210 may receive viewpoint data for all of the spectators for the content and randomly select a subset of spectators for which the viewpoint data is to be provided to the detection circuitry 220 so that only some of the acquired viewpoint data is analysed. In this way, a random selection of the spectators for the content and the associated viewpoint data can be used to select one or more regions of interest. Alternatively, the input circuitry 210 may receive viewpoint data for a subset of the spectators such that viewpoint data is received for only some of the spectators. In some examples, spectators can be grouped according to a property (e.g. skill level or amount of time for which they have been a spectator) and the input circuitry 210 can be configured to receive viewpoint data for a plurality of spectators of a given group. For example, the spectators for the content may be grouped according to information associated with a spectator such as a type of viewpoint (e.g. spectator controlled viewpoint or non-spectator controlled viewpoint). This is discussed in more detail later.

In the following, a spectator is a viewing user that views one or more images of the content and does not interact with the virtual environment. In the case where the content is video game, a spectator is a viewing user that views one or more images of the video game without actively participating in the execution of the video game. For example, a video game may be executed by a game server and one or more images of the video game can be communicated to a user device 100 of a spectator for allowing the video game, which may be played between other playing users which each provide user inputs for updating the execution of the video game, to be watched by the spectator.

The data processing apparatus 200 may for example be provided as part of the server 110 that communicates image data to the respective user devices 100 of the respective spectators. Alternatively, the data processing apparatus 200 may in some cases be provided as part of a user device 100 of a spectator. In some cases, the data processing apparatus 200 may be provided as part of a game server that executes a video game application to generate images for display to the spectators. Alternatively, the data processing apparatus 200 may be provided as part of a server, such as a spectator monitoring server, that communicates with a game server to receive the viewpoint data for a plurality of spectators from the game server. It will be appreciated that the data processing apparatus 200 can be provided as part of any processing device so as to allow viewpoint data to be acquired for a plurality of spectators of a content.

In embodiments of the disclosure, a system comprises: a server 110 comprising the data processing apparatus 200; and a plurality of user devices 100 associated with the plurality of spectators of the virtual environment, wherein the output circuitry 240 is configured to output the data indicative of one or more of the selected regions to one or more of the user devices 100. The data processing apparatus 200 is preferably provided a part of the server 110 that communicates image data for a content to a user device 100 of a spectator. In this case the data processing apparatus 200 can obtain viewpoint data indicative of a viewpoint for a spectator by extracting the viewpoint data from a video stream to be communicated from the server 110 to the spectator's device. The server 110 can be configured to communicate a video stream to a spectator's device, where each image of the video stream has a corresponding viewpoint (which may be controlled by the spectator, controlled by a commentator, controlled by a player of a video game or may remain fixed, for example). Therefore, the data processing apparatus 200 can extract the viewpoint data for a spectator from a video stream that is to be communicated to the spectator. Hence more generally, the data processing apparatus 200 can be configured to acquire viewpoint data for a spectator on the basis of the video stream provided to the spectator. In some examples, the output circuitry 240 can be configured to output the data indicative of a selected region to each of the spectators of the virtual environment, even though in some cases the input circuitry 210 may not receive the viewpoint data for all of the spectators. Alternatively, the output circuitry 240 can be configured to output the data indicative of a selected region to a subset of the spectators, such as the subset of the spectators for which the viewpoint data is received. In some examples, spectators may be grouped and the output circuitry 240 can be configured to output the data to one or more groups of spectators. For example, spectators may be grouped according to one or more properties, such as skill level for a given video game, an amount of time for which they have been a spectator or whether the spectator has selected to received data indicative of a selected region.

In some examples, rather than acquiring the viewpoint data from a video stream that is to be communicated to a user device 100, the input circuitry 210 can communicate via a wireless communication with another device to receive the viewpoint data for a spectator's viewpoint. For example, the input circuitry 210 can be configured to communicate with a respective user device 100 of a spectator or a game server executing an instance of a video game to acquire the viewpoint data for a plurality of spectators. In some examples, a game server may be provided for executing a video game application responsive to inputs from players, and one or more video streams can be generated each having a respective viewpoint. The one or more video streams can either be distributed by the game server to the respective spectators, or in some cases another server may communicate with the game server to distribute the one or more video streams. The data processing apparatus 200 can be provided as part of any server that is responsible for distributing the one or more video streams so that the data processing apparatus 200 can acquire the viewpoint data or the data processing apparatus 200 may instead be provided as part of a first server that communicates directly with a second server that distributes the one or more video streams so as to receive the viewpoint data.

In some examples, the data processing apparatus 200 may be provided as part of a user's device 100 (for example, as part of a user's personal computer or game console) such that when the user is viewing images of a content (such as an online e-sports event) provided to the user's device, the data processing apparatus 200 can also receive viewpoint data for other users viewing the content.

In some arrangements, spectators are able to select a viewpoint from a plurality of candidate viewpoints for a content. A plurality of candidate viewpoints can be defined for a content and used to generate respective video streams for output to the spectators. For example, a candidate viewpoint may correspond to a first or third person viewpoint of a given player character in a game, such that a spectator can select the viewpoint in order to follow the given player character in the virtual environment. Another candidate viewpoint may correspond to a viewpoint of a commentator for the content, where the commentator controls the viewpoint to move around the virtual environment. The commentator does not actively participate in the game and may or may not have an associated character (avatar) in the virtual environment. Another candidate viewpoint may be a fixed viewpoint having a fixed position and orientation in the virtual environment. Alternatively or in addition, in some arrangements each spectator may select a candidate viewpoint which can be updated by the spectator responsive to a user input from the spectator, such as a controller input, so that the candidate viewpoint can be manipulated by the spectator to move around the virtual environment. In this way, the spectator can control one or more properties of the viewpoint to allow portions of the virtual environment that are of interest to the spectator to the viewed by the spectator.

The detection circuitry 220 is configured to detect a portion of the virtual environment viewed by a respective viewpoint in dependence upon the viewpoint data. The viewpoint data for a viewpoint provides an indication of at least a position and orientation of the viewpoint with respect to the virtual environment. The detection circuitry 220 can be configured to detect, in dependence upon the viewpoint data, a portion of the virtual environment included in one or more images generated for display to the spectator. In a simplest case, the detection circuitry 220 can detect a portion of the virtual environment corresponding to the centre (e.g. centre point or central area) of the field of view of the viewpoint. In other words, using the position and orientation of the viewpoint a sight line direction (gaze direction) for the spectator can be assumed to correspond to the centre of the field of view and a portion of the virtual environment viewed (intersected) by the sight line direction can be detected. In some examples, a sight line direction for the spectator can be assumed to correspond to a central part of the field of view (e.g. 5, 10, 15, 20, 25 or 30 degrees centred on the centre of the field of view) and the detection circuitry 210 can be configured to detect a portion of the virtual environment viewed by the central part of the field of view. Cameras that automatically follow specific characters/objects, will also automatically meet these criteria, and so the above approach may be used for both user controlled and automatic viewpoints, and/or in the case of automatic cameras the position of the tracked object can be obtained directly without recourse to further analysis of the viewpoint data.

In addition, it is expected that a spectator, commentator or player will target their gaze point towards a portion of the virtual environment that is within a predetermined distance of the viewpoint. For a portion of the virtual environment included within the field of view but located more than the predetermined distance from the viewpoint it is generally expected that the entity (spectator, commentator or player, where player may be a real-world user or a non-player character) controlling the viewpoint would adjust the viewpoint to position the viewpoint to be nearer to that portion if that portion is of interest to the spectator. Therefore, the detection circuitry 220 can optionally be configured to detect a portion of the virtual environment included within the central part of the field of view of the viewpoint and within a predetermined distance of the viewpoint. Hence more generally, the detection circuitry 220 can be configured to detect a portion of the virtual environment within a predetermined distance of a viewpoint and included within a field of view of the viewpoint. In this way, the detected portion for a viewpoint can be considered to be truncated so as to avoid the detected portion extending to include a portion that is not observed by the spectator. Alternatively or in addition, the contribution of a spectator toward the identification of a hotspot (as discussed elsewhere herein) can be reduced as a function of distance, so that more distant observers contribute less toward any threshold, histogram count, hotspot intensity level, or the like, Optionally in this case such a drop-off may occur for distances larger than a first threshold distance, and further optionally may taper to zero by a second threshold distance.

Consequently, the detection circuitry 220 can detect a portion of the virtual environment observed by each of the plurality of spectators (such that each of the plurality of spectators has a viewpoint and an associated detected portion for that viewpoint) and, on the basis of at least some of the detected portions, the selection circuitry 230 can select one or more regions of the virtual environment, where a region may be a predefined region having a predefined shape or a region may have a shape that varies depending on how the detected portions overlap each other. For example, the virtual environment may be segmented (divided) into predefined regions each having a same shape and size and the selection circuitry 230 can be configured to select a predefined region in dependence upon at least some of the portions detected by the detection circuitry 220. It will be appreciated that the virtual environment can be divided into predefined regions having any suitable shape and size and the regions may not necessarily be of the same size and shape as each other. In some examples, the virtual environment is divided into the predefined regions such that each region has a size (volume) in the virtual environment that is smaller than a size of a portion detected by the detection circuitry 220 for a respective viewpoint. In this way, a given detected portion detected by the detection circuitry 230 for a given viewpoint may intersect (overlap) a plurality of regions in the virtual environment. For example, each region of the virtual environment may be considered to be a voxel and a plurality of the voxels can be intersected by a given detected portion. In some examples, the virtual environment can be divided into N×M regions, such that when the virtual environment is viewed in 2D plan view from above (e.g. a 2D map) each region occupies a respective two-dimensional area of the 2D plan view with N regions arranged along a first axis and M regions arranged along a second axis.

The detection circuitry 220 is configured to detect a portion of the virtual environment viewed by a viewpoint and to detect whether the viewpoint corresponds to a region of the virtual environment according to whether the detected portion as least partially intersects the region of the virtual environment. The selection circuitry 230 can be configured to select a region in dependence upon whether a detected portion intersects the region or in dependence upon a number of detected portions that intersect the region. Put differently, the selection circuitry 230 can be configured to select a region in dependence upon whether a viewpoint (which has an associated detected portion) corresponds to the region or in dependence upon a number of viewpoints that correspond to the region. This is discussed in more detail later.

The output circuitry 240 is configured to output data (also referred to as selected region data) indicative of at least one region selected by the selection circuitry 230. The data may be indicative of one or more position coordinates associated with the selected region of the virtual environment. For example, data may be output for a selected region to indicate a position coordinate corresponding to the centre of the selected region or the data may be indicative of a position coordinate for one or more vertices defining a perimeter of the selected region. In some examples, the virtual environment can be segmented into a plurality of regions each having a predefined shape and size and the output circuitry 240 can be configured to output data indicative of an ID number associated with a given region when the given region is selected by the selection circuitry 230. Hence more generally, the output circuitry 240 is configured to output selected region data to a recipient device (e.g. user device 100) to indicate to the recipient device a region of the virtual environment selected by the selection circuitry 230 which is of interest to at least some of the spectators for which the viewpoint data is acquired.

The output circuitry 240 can be configured to output the selected region data to a user device 100 via a wireless communication, where the user device 100 may be a spectator's device, a player's device (that is a player actively participating in execution of a video game associated with the virtual environment) or a commentator's device. The selected region data indicates a position of at least one of the selected regions and can be used by the recipient device to visually indicate and/or audibly indicate to the associated spectator, commentator or player, a position of the selected region. In some examples, the selected region data is used by the recipient device to generate a two-dimensional or three-dimensional image for the virtual environment indicating a position of a selected region in the virtual environment. Alternatively or in addition, the selected region data may be used by the recipient device to generate an audio signal for audibly indicating a position of a selected region.

In embodiments of the disclosure, the selection circuitry 230 is configured to select a region that is one selected from the list consisting of: a predefined region of the virtual environment; and a region defined by each location in the region being within a predetermined distance of at least a threshold number of the detected portions. As discussed previously, the virtual environment can be segmented into a plurality of predefined regions having a predefined shape and size which are selectable by the selection circuitry 220 in dependence upon at least some of the portions detected by the detection circuitry 220. In some cases the selection circuitry 220 can select a region having a shape and size that is not predefined and which is instead dependent upon a relative arrangement of the respective detected portions, such that the regions has a shape and/or size that varies according to the arrangement of the respective detected portions. Therefore, a region defined by at least a threshold number of detected portions of the virtual environment each being within a predetermined distance of another of the detected portions can be selected by the selection circuitry 230.

Figure 3A:
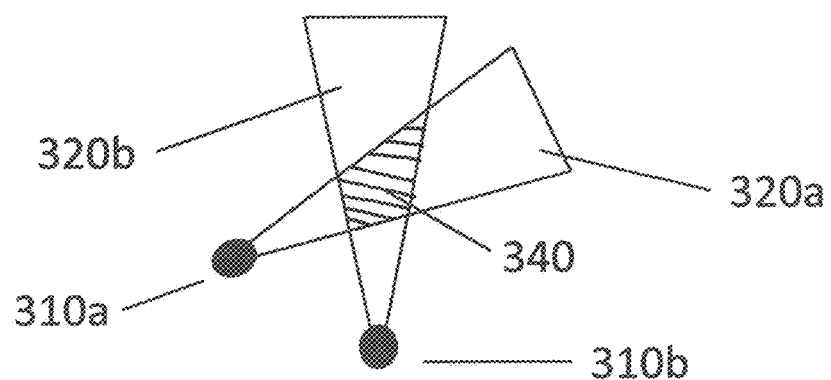
FIGS. 3*a*, 3*b* and 3*c* are schematic diagrams illustrating selecting regions of a virtual environment in dependence upon at least some detected portions.
Figure 3B:
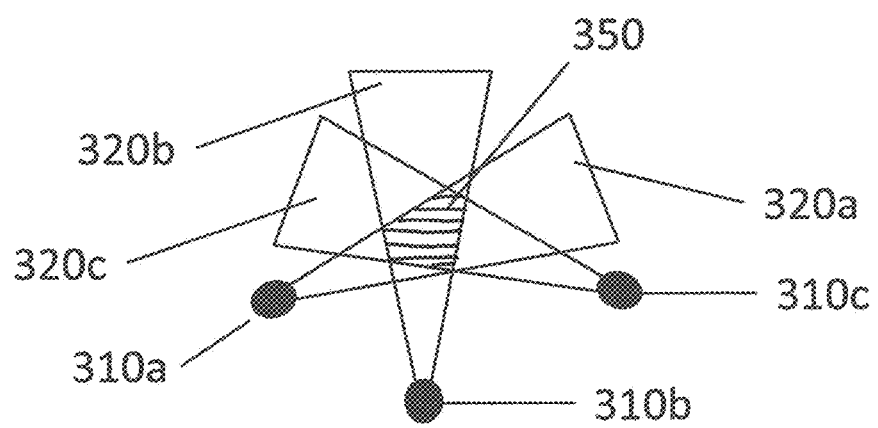

FIGS. 3a and 3b schematically illustrate examples of a selected region having a shape and size defined by a threshold number of detected portions of the virtual environment. FIGS. 3a and 3b schematically illustrate an example of a detected portion in a 2D plan view and it will be appreciated that the detected portion occupies a volume in the virtual environment. FIG. 3a shows two respective viewpoints 310a, 310b and the detected portions 320a, 320b associated with each viewpoint. FIGS. 3a and 3b are schematic examples and the detected portions may differ in shape from that shown. FIG. 3a illustrates an example in which the selection circuitry 230 selects a region 340, in which each location within the region 340 is within a predetermined distance of a threshold number of detected portions, wherein in the example shown the threshold number of detected portions is two. In FIG. 3a, the selection circuitry 230 selects the region 340, where the region 340 has a shape that is dependent upon the arrangement of the detected portions.

Similarly, FIG. 3b shows three respective viewpoints 310a, 310b, 310c and the detected portions 320a, 320b, 320c associated with each viewpoint. FIG. 3b illustrates an example in which the selection circuitry 230 selects a region 350 of the virtual environment, in which each location within the region is within a predetermined distance of a threshold number of detected portions, wherein in the example shown the threshold number of detected portions is three. In FIG. 3b, the selection circuitry 230 selects the region 350, where the region 350 has a shape that is dependent upon the detected portions. It will be appreciated that the threshold number of detected portions may be set to any value that is greater than one. For example, referring to FIG. 3b, the threshold number of detected portions may instead be set to two, in which case the shape and size of the region differs from the shape and size of the region 350.

Figure 3C:
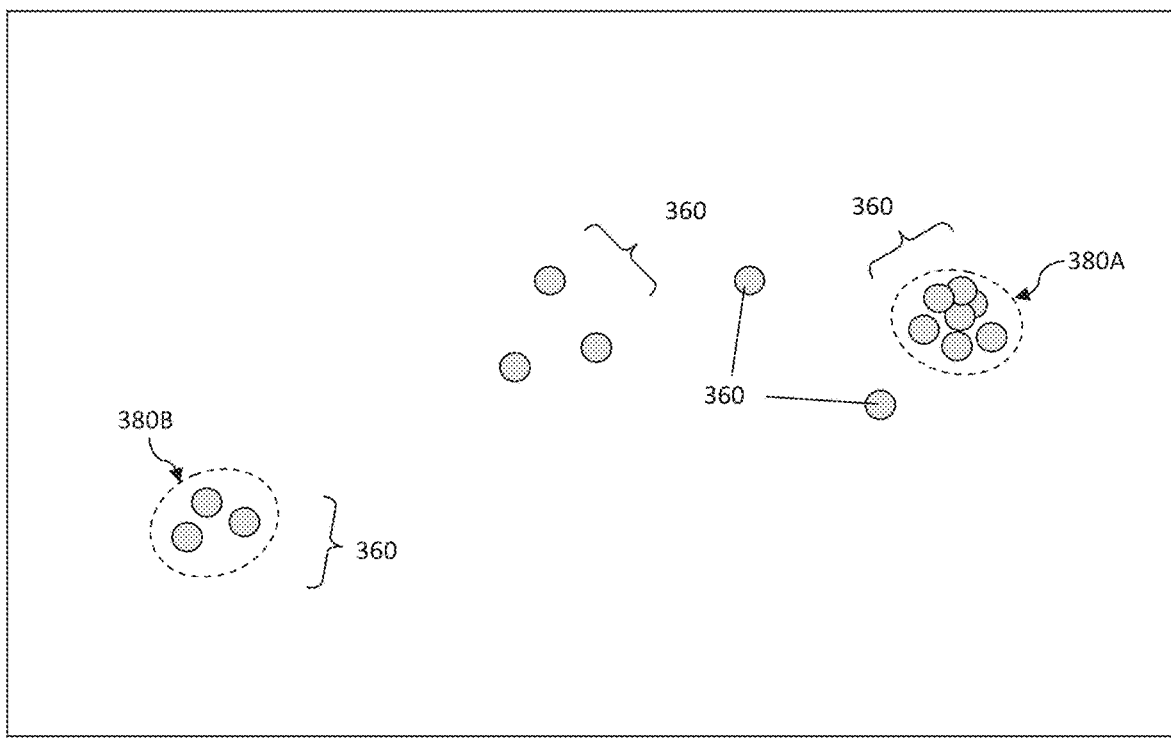

FIG. 3c shows portions 360 of the virtual environment as described elsewhere herein, each corresponding to a locus of interest of a spectator. In this case, the detection portion evaluates the number of portions within a predetermined distance of each other, and if this exceeds a threshold then the area comprising these portions is defined as a region (380A,B). The boundary of the region can then optionally be defined by each location in the region being within a predetermined distance of at least a threshold number of the detected portions.

A value (e.g. a hotspot intensity value) may optionally be given as a function of the number of portions and/or the proximity of those portions to each other. Hence the region 380A will have a higher value than the region 380B, and this may subsequently be used to differentiate the regions graphically, for example using the value to modify brightness, colour, or aura (e.g. a region around a hotspot to indicate its importance, which may be helpful for example it a lot of spectators are in one location and hence the hotspot is important but small).

Herein, a selected region refers to a region of the virtual environment that may be a predefined region having a predefined shape or a region having a shape that is defined by how the detected portions overlap with each other for the virtual environment.

In embodiments of the disclosure, the selection circuitry 230 is configured to select a region of the virtual environment in dependence upon whether a number of the respective viewpoints/portions corresponding to the region satisfies a threshold condition for region selection. Each detected portion occupies a volume within the virtual environment such that a detected portion may overlap (intersect) one or more regions within the virtual environment. For a region having a predefined shape and size, or a shape and size that is not predefined, the selection circuitry 230 can be configured to select the region depending on whether a number of detected portions that at least partially overlap with the region satisfies a threshold condition for region selection. For example, as a threshold condition for region selection, the selection circuitry 230 may require that at least a threshold number of detected portions at least partially overlap a region, such that the selection circuitry 230 selects the region when the threshold condition for region selection is satisfied and does not select the region when the threshold condition for region selection is not satisfied. Therefore, the selection circuitry 230 can be configured to firstly select a region when the threshold condition for region selection is satisfied for the region and to then deselect the region when the threshold condition for region selection is not satisfied for the region. Alternatively, in some examples, as the threshold condition for region selection, the selection circuitry 230 may require that at least a threshold number of detected portions at least partially overlap a region for at least a predetermined period of time. For example, the selection circuitry 230 may require that a region is overlapped by at least two (or N, where N is any integer greater than or equal to two) detected portions for at least Y seconds (e.g. Y=5 seconds) in order to select the region. In some cases, the selection circuitry 230 may require that a region is overlapped by at least a threshold number of same detected portions for at least Y seconds. Requiring that a threshold number of same detected portions corresponds to the region for at least a predetermined period of time can reduce the likelihood of falsely selecting a region and is particularly beneficial for virtual environments with large numbers of spectators.

For a selected region having a shape and size that is not predefined but instead is dependent upon a spatial arrangement of the detected portions, the shape and size of the selected region can vary such that the selected region defines a volume for which all of the volume satisfies the threshold condition for region selection. In particular, the selection circuitry 230 may select the region by determining whether a location within the region is within a predetermined distance of a threshold number of detected portions, and may optionally require that the location is within the predetermined distance of the threshold number of detected portions for a predetermined period of time.

The threshold condition for region selection may be set in advance or may vary in dependence upon a number of spectators for the virtual environment or a number of spectators for which viewpoint data is acquired. As such, the threshold number of detected portions and/or the predetermined period of time may have a fixed value set in advance, or at least one of the threshold number of detected portions and the predetermined period of time may have a larger value for the case where there is a larger number of spectators and a smaller value for the case where there is a smaller number of spectators.

In embodiments of the disclosure, the selection circuitry 230 is configured to assign a priority rating to a selected region in dependence upon a number of the respective viewpoints corresponding to the selected region. The selection circuitry 230 can be configured to select a region of the virtual environment in dependence upon a spatial relationship between the region and at least some of the detected portions in the virtual environment, and in response to the selection of the region the selection circuitry 230 can assign a priority rating to the selected region depending on a number of detected portions (and thus a number of respective viewpoints) corresponding to the selected region. In this way, a priority rating can be assigned so as to distinguish between selected regions of lower priority and selected regions of higher priority, where a higher priority selected region has a larger number of corresponding viewpoints and is of higher interest.

In embodiments of the disclosure, the priority rating is indicative of the number of the respective viewpoints corresponding to the selected region. In some cases, the selection circuitry 230 is configured to assign a priority rating to each region selected by the selection circuitry 230, where the priority rating for each selected region is indicative of a number of respective viewpoints detected as corresponding to the selected region, and where each viewpoint is associated with a respective spectator. As such, the priority rating assigned to a selected region provides an indication of a level of priority for the selected region, where selected regions having a higher number of corresponding viewpoints have a higher level of priority and selected regions having a lower number of corresponding viewpoints have a lower level of priority. For a plurality of selected regions each having an associated priority rating, the priority rating provides an indication of a relative importance of a selected region relative to another selected region.

In some examples, the priority rating may take the form of a number which may be indicative of the number of viewpoints corresponding to the selected region. For example, a value of a priority rating assigned to a selected region may increase with increasing number of viewpoints corresponding to the selected region such that there is a relationship between the value of the priority rating and the number of corresponding viewpoints. Alternatively, the priority rating may take the form of any suitable indicator that can be mapped to a number of viewpoints using a mapping table. Alternatively, the priority rating may take the form of flag data, as discussed below, in which case the presence of the flag data assigned to a selected region indicates that the selected region has at least a given number of viewpoints corresponding to the selected region.

In some examples, the data processing apparatus 200 may comprise ranking circuitry (not shown in FIG. 2) to rank at least some of the selected regions in dependence upon the priority ratings so that a selected region having a priority rating indicative of a high level of priority can be ranked higher than a selected region having a priority rating indicative of a low level of priority. In some cases, the output circuitry 240 can be configured to output data indicative of one or more selected regions according to the priority rating. For example, the output circuitry 240 may output data for a predetermined number of selected regions having the highest priorities, where the highest priority regions are identified based on the priority ratings. As such, the output circuitry 240 may be configured to output data for the top N (e.g. top 5) highest priority regions. In this way, rather than outputting data for each selected region, data can be output by the output circuitry 240 for the selected regions having the highest priority. Therefore, rather than outputting data indicating each of the detected portions, or each of the selected regions, the output circuitry 240 can output data indicating some of the selected regions so as to indicate a given number of the highest priority selected regions thereby allowing efficient use of network resources. This may be particularly advantageous for indicating to a spectator, commentator or player which particular regions of the virtual environment are of highest interest. For a commentator commentating on the virtual environment, the commentator may only be interested in being informed of regions for which to commentate. Similarly, when providing data to a spectator viewing the virtual environment, it can be beneficial to indicate to the spectator regions which have at least a threshold level of interest so as to allow the spectator to more easily identify action hotspots whilst allowing efficient use of network resources.

Rather than generating a representation of the virtual environment indicating locations of each of the detected portions that are detected for the respective viewpoints and communicating the representation via a wireless communication to a user device 100, the data processing apparatus 200 can select one or more regions of the virtual environment according to whether a selection condition for a region is satisfied in dependence upon the detected portions and communicate data indicative of a selected region to the user device 100. In this way, data can be efficiently communicated via a network and a representation (e.g. a 2D or 3D heatmap for the virtual environment indicating one or more selected regions) can optionally be generated by a recipient device using the data output by the data processing apparatus 200. In addition, by configuring the output circuitry 240 to output the selected region data for the top N highest priority regions, data can be output for selected regions that are or highest priority, and this may be particularly advantageous for indicating to a commentator or a spectator or a player an area (or one or more areas) that are of highest interest. In particular, for a commentating user that is commentating for the virtual environment, the commentating user may be provided with data indicating only a highest priority selected region for commentating on. Alternatively, the commentating user may be provided with data indicating a top N highest priority selected regions for allowing the commentator to decide which of the highest priority regions to commentate on.

In embodiments of the disclosure, the selection circuitry 230 is configured to assign the priority rating to the selected region in dependence upon whether the number of the respective viewpoints corresponding to the selected region exceeds a threshold number of viewpoints. The selection circuitry 230 can be configured to either assign a priority rating to a selected region or not assign a priority rating to the selected region depending on a number of detected portions (and thus a number of respective viewpoints) that correspond to the selected region. In this way, a priority rating can be selectively assigned to a selected region so that a priority rating is assigned to a selected region having at least a threshold number of corresponding viewpoints, and a priority rating is not assigned to a selected region having less than a threshold number of corresponding viewpoints. Therefore, in some examples the priority rating may take the form of flag data that is assigned to selected regions having more than a threshold number of viewpoints such that the presence of the flag data in association with a selected region indicates that the region is a high priority region and the absence of the flag data in association with a selected region indicates that the region is not a high priority region. In this way, the output circuitry 240 can output the data indicative of one or more selected regions having associated flag data so as to provide an indication to a recipient device of each selected region having at least a threshold amount of interest. The data output by the output circuitry 240 can thus be received by a recipient device to allow the recipient device to be informed of selected regions having associated flag data and optionally a representation of the virtual environment can be generated to visually indicate the selected regions having the associated flag data.

In some embodiments, the selection circuitry 230 is configured to assign the priority rating to the selected region in dependence upon whether the number of the respective viewpoints corresponding to the selected region exceeds a threshold number of viewpoints, and wherein the priority rating is indicative of the number of the respective viewpoints corresponding to the selected region. The selection circuitry 230 can be configured to selectively assign the priority rating to a selected region according to whether the number of viewpoints detected by the detection circuitry 220 as corresponding to the region exceeds the threshold number of viewpoints, and when the number of viewpoints for the region does exceed the threshold a priority rating can be assigned to the selected region, where the priority rating is indicative of how many viewpoints correspond to the selected region. By using a threshold condition and assigning a priority rating indicative of a number of viewpoints corresponding to the selected region, the presence of the priority rating indicates that the selected region is of at least a threshold level of interest and the priority ratings can further be used to distinguish between the regions according to their relative priority.

In embodiments of the disclosure, the output circuitry 240 is configured to output the data indicative of the selected region in dependence upon the priority rating assigned to the selected region. In some cases, the output circuitry 240 can be configured to output data for a selected region depending on whether a priority rating is assigned to a selected region so that data is not output for a selected region that does not have an assigned priority rating. As such, in some cases the output circuitry 240 is configured to output data indicative of each selected region having an assigned priority rating. Hence more generally, the output circuitry 240 can be configured to output the data indicative of the selected region in dependence upon presence or absence of a priority rating for a selected region. Alternatively, the output circuitry 240 can be configured to output data for a selected region depending on whether a priority rating assigned to a selected region satisfies a threshold condition for data transmission.

In embodiments of the disclosure, the output circuitry 240 can be configured to output the data indicative of the selected region when the priority rating associated with the selected region has a higher priority or a same priority as a threshold priority rating. The priority rating assigned to a selected region indicates a level of priority for that selected region. As explained above, in some cases the priority rating may take the form of flag data such that the presence of the flag data indicates a first level of priority and the absence of the flag data indicates a second level of priority, where the first level of priority is a higher priority than the second level of priority. In this case, the threshold priority rating may be set to the first level of priority and as such the output circuitry 240 can be configured to output data for each selected region having associated flag data. However, in some cases the priority rating can provide an indication of a number of corresponding viewpoints for a selected region such that the priority rating provides an indication of a relative priority of a selected region relative to another selected region having an assigned priority rating. In particular, the priority rating can provide an indication of a number of respective viewpoints corresponding to a selected region, where a higher priority is associated with a greater number of respective viewpoints and a lower priority is associated with a lower number of respective viewpoints.

For the case where the priority rating is indicative of the number of the respective viewpoints corresponding to the selected region, the output circuitry 240 can be configured to output data for a selected region depending on whether the number of the respective viewpoints corresponding to the selected region satisfies a threshold condition for data transmission. For example, the output circuitry 240 can be configured to output data for a selected region when the number of respective viewpoints corresponding to the selected region is greater than or equal to a threshold number of respective viewpoints, where the threshold number of respective viewpoints may be a predetermined number set in advance or the threshold number may vary depending on one or more properties associated with the virtual environment. In some examples, the predetermined number of respective viewpoints may be set in advance to have a value of N, where N is an integer that can have any value greater than or equal to two, so that the output circuitry 240 outputs data for a selected region when the priority rating indicates that there are at least N corresponding viewpoints for the selected region. In other examples, the threshold number of respective viewpoints may vary in dependence upon either a total number of spectators for the virtual environment or a number of spectators for which viewpoint data is acquired by the input circuitry 210. For example, for a content for which the number of spectators is X (where X may vary by increasing and/or decreasing as spectators join and leave), the threshold number of respective viewpoints may be set to a number that is a given proportion of the spectators, such as X/2, X/3, X/4 . . . X/20. In other words, the threshold number of respective viewpoints can be set so that the threshold is equal to a given proportion of the total number of spectators (e.g. 10%) and the output circuitry 240 outputs data for a selected region when the priority rating for a selected region indicates that the number of viewpoints corresponding to the selected region is greater than or equal to the given proportion of the total number of spectators (note that viewpoint data may be acquired for just a subset of the spectators viewing the content, such as 50% of the spectators). Similarly, the threshold number of respective viewpoints can be set so that the threshold is equal to a given proportion of the total number of spectators for which viewpoint data is acquired and analysed by the data processing apparatus 200. For example, the threshold number of respective viewpoints may be set to 20% of the number of spectators for which viewpoint data is analysed by the data processing apparatus 200.

In some embodiments the output circuitry 240 is configured to output the selected region data indicative of a selected region in dependence upon the priority rating so that selected region data is output for only the selected region having the highest priority. This may be particularly useful when the recipient device is a user device 100 of a commentator, since the commentator is likely to be interested in being informed of just the region which has the highest number of corresponding viewpoints so as to commentate on that region. As explained previously, the data processing apparatus 200 optionally comprises ranking circuitry to rank at least some of the selected regions in dependence upon the priority ratings so that a selected region having a priority rating indicative of a higher level of priority can be ranked higher than a selected region having a priority rating indicative of a lower level of priority. In some embodiments, the ranking circuitry is configured to rank the selected regions that have an assigned priority rating in dependence upon the priority ratings so as to order the selected regions from highest priority to lowest priority. The output circuitry 240 can be configured to periodically output data indicative of the highest ranked selected region (i.e. the selected region having the highest priority level that is ranked highest). Alternatively or in addition, the output circuitry 240 can be configured to output data indicative of the highest ranked selected region in response to a change in the ranking order, which may be any change in the ranking order or a change in the highest ranked selected region or a change in the top N highest ranked selected regions. In particular, the output circuitry 240 can be configured to output data indicative of the highest ranked selected region in response to a change in the highest ranked selected region, such that the data is output for the highest ranked selected region when there is a change, and a commentator can be notified to direct their commentary to another region (a new highest ranked region) of the virtual environment that is of highest priority. It will be appreciated that the output circuitry 240 can be configured to periodically output data indicative a plurality of selected regions, for example by outputting selected region data for the selected regions ranked in the top N (N=2, 3, 4, or 5 for example).

In embodiments of the disclosure, the data output by the output circuitry 240 is indicative of the selected region and the priority rating assigned to the selected region. In addition to indicating the selected region, the data output by the output circuitry 240 can also indicate the priority rating for the selected region. For example, the output circuitry 240 may output selected region data indicating: an identification number and/or a position of a first selected region and a first priority rating; and an identification number and/or a position of a second selected region and a second priority rating. Therefore, the data processing apparatus 200 can indicate, via the network, to the recipient user device 100 the two selected regions and the two priority ratings so that a user at the recipient user device 100 can understand which of the two selected regions is of higher priority. Using the data output by the output circuitry 240, the recipient user device 100 can generate a representation of the virtual environment visually indicating both the first and second regions and the associated priority ratings. For example, the recipient device may generate a 2D or 3D heatmap image for the virtual environment indicating the first and second regions, and a visual indicator such as colour or a text item can be used to indicate the associated priority ratings for the regions. In a simplest case, the priority rating can be used by the recipient device to generate a visual indicator comprising a number indicative of the relative priority for the selected region. For example, a number ranging from 0 to 1 (or 0 to 100) may be used to indicate the relative priority for a selected region or in some cases the number may directly indicate the number of respective viewpoints detected as corresponding to the selected region. In some examples, a priority rating associated with a high level of priority may be visually indicated using a first colour (e.g. red) whereas a priority rating associated with a low level of priority may be visually indicated using a second colour (e.g. green). It will be appreciated that a range of different colours may be used to visually indicate different levels of priority for respective selected regions in this way.

In embodiments of the disclosure, the selection circuitry 230 is configured to assign, to each viewpoint, one or more classifications from a plurality of classifications in dependence upon spectator data associated with the plurality of spectators. In addition to receiving the viewpoint data for the plurality of spectators, the input circuitry 210 can be configured to receive spectator data for the plurality of spectators, where the spectator data is indicative of one or more properties associated with a spectator. In some examples, the spectator data for a spectator may comprise user profile data for the spectator indicating one or more properties for the spectator including one or more from the list consisting of: age; gender; location; nationality, spoken language(s); type of display device(s); and/or team affiliation. In some examples, the spectator data may comprise data indicative of an amount of time for which the spectator has viewed the content (e.g. data indicating a time at which the spectator began spectating or a period of time that has elapsed since the spectator began spectating). The spectator data may comprise data indicative of a type of display device used by the spectator (e.g. handheld display device, monitor type display device or HMD). The spectator data may comprise data indicative of a geographical location of the spectator, such as a city or country. The spectator data may comprise data indicative of an affiliation for the spectator such as a team, in-game character or real-world player that is supported by the spectator. The spectator data may comprise data indicative of an in-game level or skill level (e.g. beginner, intermediate, advanced) for the spectator, indicating a relative level of experience for the spectator.

On the basis of the spectator data for the plurality of users, the selection circuitry 230 can assign one or more classifications to a viewpoint for a spectator. In a simplest case, the selection circuitry 230 may define a plurality of classifications each corresponding to a period of time, and one of the classifications can be assigned to a given viewpoint for a given spectator in dependence upon an amount of time for which the spectator has been spectating. In this way, spectators (and thus the respective viewpoints) can be classified according to an amount of time for which they have been watching the content. For example, one classification may be assigned to one or more viewpoints that view the virtual environment for less than two minutes, another classification may be assigned to one or more viewpoints that view the virtual environment for at least two minutes. As explained below, classifying viewpoints in dependence upon an amount of time since the spectator started viewing the virtual environment may be beneficial because spectators that have recently joined may be less aware of a context of the virtual environment than spectators that have been spectating for a longer period of time, and it may therefore be beneficial to use a different threshold condition for region selection for different classifications, or to apply a different weighting to the respective viewpoints for different classifications, or in some cases it may be beneficial to only consider viewpoints that have been spectating for a minimum period of time when selecting a region, so as to overcome problems associated with erroneous region selection as new spectators initially scan and discover the virtual environment. Alternatively or in addition, the respective viewpoints may be classified in a similar manner to that discussed above according to a type of display device used by a spectator, a team affiliation, a skill level and/or geographical location, for example.

In embodiments of the disclosure, the selection circuitry 230 is configured to select a region of the virtual environment in dependence upon whether a number of the respective viewpoints corresponding to the region and having a same classification satisfies the threshold condition for region selection. As explained previously, a threshold condition for region selection can be implemented by the selection circuitry 230 for use in selecting one or more regions of the virtual environment responsive to the portions detected by the detection circuitry 220. In embodiments of the disclosure, the selection circuitry 230 can be configured to select a region in response to the detection circuitry 220 detecting that the number of respective viewpoints having a given classification and corresponding to the region satisfies the threshold condition for region selection. For example, for a video game for which a first team plays against a second team, the plurality of viewpoints may be classified such that at least some of the viewpoints are assigned a first classification corresponding to an affiliation with the first team and at least some of the viewpoints are assigned a second classification corresponding to an affiliation with the second team. The detection circuitry 220 can detect, for a region, whether a number of viewpoints having the first classification (or second classification) and corresponding to the region satisfies the threshold condition for region selection (e.g. whether the number of viewpoints having the first classification is greater than or equal to a threshold number), and then selection circuitry 230 can select the region when the threshold condition for region selection is satisfied. In this case, the output circuitry 240 can be configured to output the data indicative of the selected region, wherein the data further indicates the classification of the viewpoints that satisfy the threshold condition (e.g. the data may further indicate a classification such as team affiliation, duration of spectating, geographical location, skill level and/or nationality associated with the viewpoints that resulted in selection of the region). This may be particularly advantageous for indicating to a spectator, commentator or player which particular classification(s) is (or are) assigned to the viewpoints that caused the region to be selected by the selection circuitry 230. For example, a commentator can be informed of the location of the selected region and also which team affiliation (first team or second team supporters) is associated with the threshold number of spectators that are viewing the selected region.

In some cases, spectators that have recently joined may be less aware of a context of the virtual environment and may in some circumstances be drawn towards a particular region of the virtual environment including a particular feature that may be unusual or may cause confusion for the spectators. The selection circuitry 230 can be configured to assign a first classification to each of the plurality of viewpoints that have viewed the virtual environment for less than a predetermined amount of time (e.g. 2 minutes). The selection circuitry 230 can select a region when a threshold number of viewpoints having the first classification correspond to the region and the output circuitry 240 outputs data indicative of the region and the first classification. This may be beneficial for indicating to a commentator to commentate on a particular region that causes a level confusion for recently joined spectators so as to resolve the confusion.

In some cases, a plurality of commentators may commentate on the virtual environment. For example, a first commentator may provide commentary in a first language and a second commentator may provide commentary in a second language. The output circuitry 240 can thus output data indicative of a selected region and a language classification associated with the threshold number of viewpoints that resulted in the selection of the region. The data can be output to a commentator's device 100 so that a commentator that commentates in the first language can be informed of region that is of interest to the spectators having the first language and thus commentate on that region. Similarly, a commentator that commentates in the second language can be informed of a region that is of interest to the spectators having the second language. In an online multiplayer game, certain spectators may be more interested in watching a character associated with a real-world player from a same country or city as them, and as such viewpoints can be classified according to language and/or nationality and/or geographical location and a recipient device of a commentator can be provided within information indicating the region that is selected and a language and/or nationality and/or geographical location classification of the threshold number of viewpoints corresponding to the selected region.

In some cases, a different threshold condition for region selection may be used for different classifications, such that a first threshold condition for region selection is used for selecting a region in dependence upon the viewpoints having the first classification and a second threshold condition for region selection is used for selecting the region in dependence upon the viewpoints having the second classification. For example, the selection circuitry 230 can be configured to select a region when the number of viewpoints having the first classification and detected as corresponding to the region exceeds a first number of viewpoints, and to select the region when the number of viewpoints having the second classification and detected as corresponding to the region exceeds a second number of viewpoints, where the first number of viewpoints is different from the second number of viewpoints. In the case of a video game where a first team plays against a second team (such as the video game Counter-Strike®), some of the plurality of spectators may support the first team and some of the plurality of spectators may support the second team and more of the spectators may support one team than the other. Therefore, in this case a different threshold condition for region selection may be used for the two classifications. For example, there may be X viewpoints having the classification indicating support for the first team and Y viewpoints having the classification indicating support for the second team, where Y is less than X. Therefore, the threshold condition for region selection may in this case be set to vary in dependence upon a number of spectators having a given classification so that a region is selected when the number of viewpoints corresponding to the region and having the first classification exceeds X/10 (10% of the spectators having the first classification) and so that region is selected when the number of viewpoints corresponding to the region and having the first classification exceeds Y/10 (10% of the spectators having the second classification).

In embodiments of the disclosure, the selection circuitry 230 is configured to calculate a value for a region of the virtual environment in dependence upon the respective viewpoints corresponding to the region, wherein the selection circuitry 230 is configured to assign a weighting parameter to at least one of the respective viewpoints corresponding to the region in dependence upon a classification assigned to the respective viewpoint, and wherein the selection circuitry 230 is configured to select the region of the virtual environment in dependence upon whether the value for the region exceeds a threshold value for a threshold amount of time. The selection circuitry 230 can calculate a value for each region of the virtual environment having a corresponding viewpoint. As such, in the case where the detection circuitry 220 detects that a plurality of viewpoints correspond to a given region, the selection circuitry 230 calculates a value for the given region using a first parameter associated with each of the plurality of viewpoints corresponding to the given region. The selection circuitry 230 calculates the value for the given region using a calculation that combines the plurality of first parameters. Any suitable calculation can be used that calculates a value for the given region that is dependent on a first parameter for each of the viewpoints corresponding to the region. For example, in a simplest case the selection circuitry 230 may use a calculation that sums the first parameter for each of the plurality of viewpoints corresponding to the given region to calculate a value for the given region. Therefore, the value calculated for the given region can be indicative of a number of viewpoints corresponding to the given region in the case where first parameter is the same for each of the viewpoints. However, the selection circuitry 230 can be configured to assign one or more weighting parameters to a viewpoint in dependence upon one or more classifications assigned to the viewpoint. As explained above, the selection circuitry 230 may assign one classification from a plurality of classifications to a viewpoint in dependence upon a viewing time associated with the viewpoint. A first classification may be assigned to a viewpoint having a viewing time of less than 2 minutes, a second classification may be assigned to a viewpoint having a viewing time of at least 2 minutes and less than 5 minutes, and a third classification may be assigned to a viewpoint having a viewing time of at least 5 minutes. The selection circuitry 230 can therefore assign a weighting parameter to a respective viewpoint in dependence upon the classification assigned to the viewpoint, in which a first weighting parameter is assigned for a viewpoint having been assigned a first classification, a second weighting parameter is assigned for a viewpoint having been assigned a second classification, and a third weighting parameter is assigned for a viewpoint having been assigned a third classification, where the first, second and third weighting parameters are different from each other. In particular, the first weighting parameter has a smaller value than the second weighting parameter, and the second weighting parameter has a smaller value than the third weighting parameter. Therefore, when calculating a value for a given region, a viewpoint having been assigned the third classification has more significance than a viewpoint having the second classification, and a viewpoint having been assigned the second classification has more significance than a viewpoint having been assigned the first classification. For example, for a given region having three corresponding viewpoints, where the three view points have the first, second and third classification, respectively, the selection circuitry can calculate a value (also referred to as an interest value) for the given region in dependence upon the first parameter associated with each viewpoint and the respective weighting parameters associated with each viewpoint, according to the following expression: Interest value= (a1×w1)+(a2×w2)+(a3×w3), where a1, a2 and a3 represent the first parameter for each of the viewpoints and w1, w2 and w3 represent the weighting parameters for each of the viewpoints. It will be appreciated that in the case where a classification is not assigned to a viewpoint, the above expression still holds and that there is no weighting parameter for such a viewpoint. It will be appreciated that whilst the above example has been described with reference to three classifications, the above example can be implemented using a plurality of viewpoints where at least one of the viewpoints has an assigned classification. Consequently, an interest value can be calculated for a given region in dependence upon the respective viewpoints corresponding to the region, where one or more of the viewpoint can be assigned a weighting parameter, such that some viewpoints contribute more to the interest value than others. Continuing with the above example, the selection circuitry 230 compares the calculated interest value with a threshold value for region selection so as to select the region when the calculated interest value is greater than the threshold value. For example, due to the difference in the weighting parameters, for the case where ten viewpoints having the first classification correspond to a region, the magnitude of the calculated interest value may not exceed the threshold value for region selection. However, for the case where five viewpoints having the first classification and five viewpoints having the second classification correspond to the region, the magnitude of the calculated interest value may exceed the threshold value for region selection, because viewpoints having a longer viewing time are given a larger weighting parameter. It will be appreciated that the values of the weighting parameters and threshold value for region selection can be set to any appropriate value so as to allow a region to be appropriately selected.

In addition, in some cases the selection circuitry 230 is configured to assign a priority rating to a selected region in dependence upon a magnitude of the interest value so that a larger interest value corresponds to a higher level of priority. As such, when the output circuitry 240 outputs the data indicative of both the selected region and the priority rating for the region, the data provides an indication of an interest value for the region. Even though a number of viewpoints corresponding to a first region may be less than a number of viewpoints corresponding to a second region, a larger interest value may in some cases be calculated for the first region when the viewpoints corresponding to the first region have a larger weighting. For example, the spectators watching the first region may be spectators that have long viewing times or have a higher skill level (e.g. classified as having advance skill level), whereas the spectators watching the second region have shorter viewing times of have a lower skill level (e.g. classified as having beginner skill level). Therefore, rather than being informed of a number of respective viewpoints corresponding to a region, a spectator, commentator or player at the recipient user device 100 can be informed of an overall level of interest for a select region which is dependent both on a number of corresponding viewpoints and a level of importance for each of the corresponding viewpoints. This can be particularly useful for a virtual environment having a large number of spectators, because respective viewpoints for respective spectators can be weighted differently so as to allow some spectators (e.g. spectators having more experience) to have more relative importance than other spectators when selecting a region and when assigning a priority rating.

Using the data output by the output circuitry 240, the recipient user device 100 can generate a representation of the virtual environment visually indicating a selected region and the associated priority rating, where the associated priority rating varies in dependence upon the interest value. As explained previously, the recipient user device 100 may generate a 2D or 3D heatmap image for the virtual environment indicating a selected region, and a visual indicator such as colour or a text item can be used to indicate the associated priority rating. Therefore, depending on the values used for the weighting parameters, in some cases a first selected region may have a red coloured visual indicator for indicating a high interest value, whereas a second selected region may have a green or blue coloured visual indicator for indicating a low interest value, even though there may in fact be a greater number of viewpoints for the second selected region, because the first region has fewer viewpoints but those viewpoints are assigned a greater weighting.

In embodiments of the disclosure, at least one of the position and orientation of the viewpoint is updated responsive to control data output by an input device associated with the spectator. An input device such as a handheld controller, pointing device (e.g. computer mouse), or HMD (e.g. Sony® PlayStation VR®) can be operated by a spectator to allow the spectator to provide a user input to update a position and orientation of a viewpoint used by the spectator to view the virtual environment. For example, the input device may be a handled controller device, such as the Sony® DualShock 4 ® controller. The input device comprises one or more sensors comprising one or more from the list consisting of: a gyroscope, an accelerometer, a magnetometer, one or more pressure sensitive switches and one or more control sticks. The one or more sensors are each configured to detect interaction by the user with the input device, by detecting one or more properties of the input device such as position, orientation, a displacement of a control stick and/or a closed or open state of a pressure sensitive switch, and a sensor is configured to generate a corresponding output indicative of one or more properties detected by the sensor. The gyroscope sensor detects an angular velocity of the input device; the accelerometer sensor detects an acceleration of the input device; and the magnetometer detects magnetic flux density which changes in response to motion of the input device. Hence, data can be output by one or more of sensors of the input device to a user device 100 for indicating a current configuration or a status of the input device and changes in the configuration of the input device resulting from interaction with the input device by the user can thus be communicated to a server and used to control a viewpoint for the images to be displayed to the spectator. It will be appreciated that other input devices may be appropriate. For example, a wristband or armband with sensors that can detect position, orientation and/or motion or any other peripheral device comprising at least one of a gyroscope, an accelerometer, a magnetometer and one or more pressure sensitive switches may be used. Hence more generally, the input device can be configured to generate and output control data in response to a user operation and the control data is provided from input device to the user device 100 via a wired or wireless communication (e.g. Wi-Fi® or Bluetooth® wireless link). The user device 100 of the spectator thus communicates the control data to a server (e.g. server 110) which is responsible for generating the images for display to the spectator, such that the server can generate the images for display to the spectator where the images are generated using a spectator controlled viewpoint.

As discussed previously, the input circuitry 210 can be configured to receive the viewpoint data for a plurality of spectators, where the plurality of spectators can be a subset of the total number of spectators of the virtual environment. In some arrangements, some spectators may select a candidate viewpoint for which the spectator is able to update at least one of the position and orientation of the viewpoint, while other spectators may select a candidate viewpoint that is updated by a commentator or a playing user (or a viewpoint that is stationary). In some arrangements, the input circuitry 210 can be configured to receive the viewpoint data for a plurality of spectators, in which the input circuitry 210 is configured to select the plurality of spectators in dependence upon a type of viewpoint. Therefore, the input circuitry 210 can select a plurality of spectators each having a spectator updatable viewpoint so that viewpoint data can be received for the selected spectators. In this way, viewpoint data can be received and used to select one or more regions that have a threshold level of interest for the spectators that are able to control their own point of view for the virtual environment.

In embodiments of the disclosure, the input device operated by a spectator is a head-mountable display (HMD) configured to output one or more images of the virtual environment for display to the spectator wearing the HMD, and wherein the viewpoint data comprises gaze data for the spectator indicative of a gaze point for the spectator with respect to the virtual reality environment. A spectator can wear an HMD to view one or more images of the virtual environment, in which the HMD comprises one or more of the sensors configured to generate and output the control data in response to a user operation for updating a position and/or orientation of the viewpoint. For example, the HMD may comprise one or more gyroscopes, accelerometers and magnetometers for tracking movements of the HMD, and a viewpoint of the images of the virtual environment generated for display to the spectator can be updated responsive to changes in the tracked position and/or orientation of the HMD. In this way, a spectator can intuitively move their head to update and control the viewpoint thereby providing a more immersive spectator experience. In addition, the HMD further comprises one or more sensors configured to detect a gaze direction of at least one of the spectator's eyes with respect to a display of the HMD. The HMD may comprise any suitable gaze tracking system that can be used to identify a position of a user's gaze within an environment displayed by the HMD. In a number of existing arrangements, this can be performed using one or more inward-facing cameras directed towards the subject's eye (or eyes) in order to determine a direction in which the eyes are oriented at any given time. Having identified the orientation of the eye, a gaze direction can be determined and a focal region can be determined. The HMD can thus be configured to output control data indicative of a gaze direction for the spectator as well as changes in a position and/or orientation of the HMD. The HMD can be configured to output the control data via a wireless communication to a server device that generates images of the virtual environment for display to the spectator. Preferably, the HMD is configured to output the control data to a user device 100 (e.g. a game console or personal computer) associated with the spectator via a wired or wireless communication, where the user device 100 is configured to communicate the control data to the server. Therefore, the input circuitry 210 can be configured to receive viewpoint data for a spectator wearing an HMD, where the viewpoint data is indicative of a position and orientation of the viewpoint for the spectator with respect to the virtual environment and a gaze point for the spectator with respect to the virtual environment, where at least one of the position and orientation of the viewpoint is updated according to changes in a position and/or orientation of an HMD worn by the spectator. Therefore, rather than assuming that a gaze direction of a spectator corresponds to a centre point (or a central part) of the field of view, as discussed previously, the detection circuitry 220 can detect a point in the virtual environment corresponding to the detected gaze direction. In some cases, the detection circuitry 230 can instead detect a portion of the virtual environment included within the field of view, where the detected portion is centred on the gaze point for the spectator (e.g. the detected portion is centred on the gaze point and covers 5, 10, 15, 20, 25 or 30 degrees of the field of view). Therefore, the detection circuitry 230 can detect a portion of the virtual environment viewed by a spectator wearing an HMD, detect whether the detected portion corresponds to one or more regions in the virtual environment, and the selection circuitry 230 can select one or more regions in dependence upon whether the threshold condition for region selection is satisfied for a region. In some arrangements the input circuitry can acquire viewpoint data for a plurality of spectators where some of the spectators wear an HMD and some of the spectators do not wear an HMD such that gaze data is received for at least some of the plurality of spectators.

Figure 4:
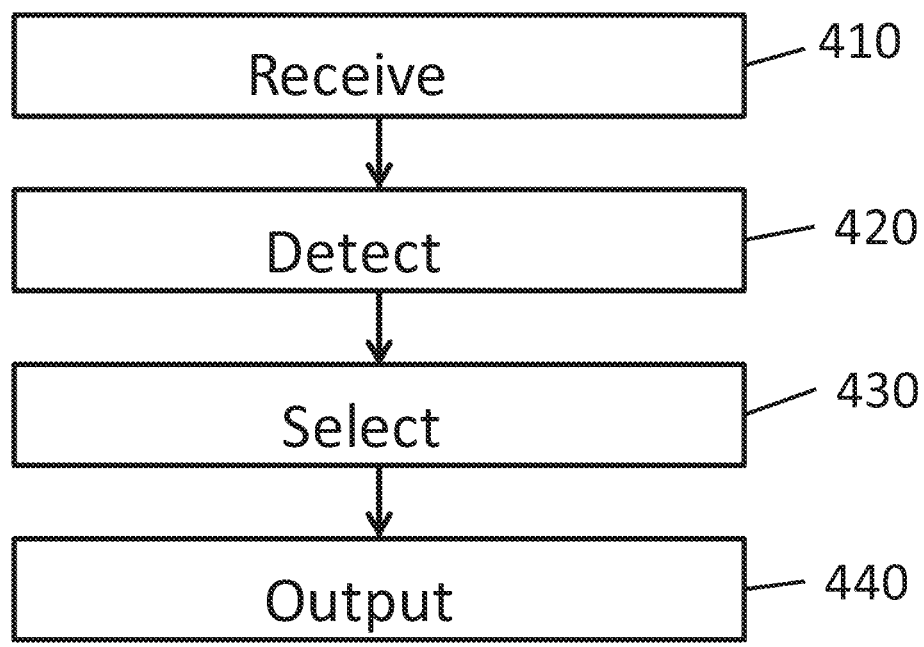
FIG. 4 is a schematic flowchart illustrating a data processing method.

Referring now to FIG. 4, in embodiments of the disclosure a data processing method comprises:

receiving (at a step 410) viewpoint data indicative of respective viewpoints for a plurality of spectators of a virtual environment;

detecting (at a step 420) a portion of the virtual environment viewed by each of the respective viewpoints in dependence upon the viewpoint data;

selecting (at a step 430) one or more regions of the virtual environment in dependence upon at least some of the detected portions; and outputting (at a step 440) data indicative of one or more of the selected regions.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A data processing apparatus, comprising:
   input circuitry to receive viewpoint data indicative of respective viewpoints for a plurality of spectators of a virtual environment;
   detection circuitry to detect a portion of the virtual environment viewed by each of the respective viewpoints in dependence upon the viewpoint data, wherein one or more of the respective viewpoints are a static or dynamic view of one or more parts of an in-game virtual environment;
   selection circuitry to select one or more regions of the virtual environment in dependence upon at least some of the detected portions; and
   output circuitry to output data indicative of one or more of the selected regions.

2. The data processing apparatus according to claim 1, wherein the selection circuitry is configured to select a region that includes one or more of:
   i. a predefined region of the virtual environment; and
   ii. a region defined by each location in the region being within a predetermined distance of at least a threshold number of the detected portions.

3. The data processing apparatus according to claim 1, wherein the selection circuitry is configured to assign a priority rating to a selected region in dependence upon a number of the respective viewpoints corresponding to the selected region.

4. The data processing apparatus according to claim 3, wherein the selection circuitry is configured to assign the priority rating to the selected region in dependence upon whether the number of the respective viewpoints corresponding to the selected region exceeds a threshold number of viewpoints.

5. The data processing apparatus according to claim 3, wherein the priority rating is indicative of the number of the respective viewpoints corresponding to the selected region.

6. The data processing apparatus according to claim 3, wherein the output circuitry is configured to output the data indicative of the selected region in dependence upon the priority rating assigned to the selected region.

7. The data processing apparatus according to claim 6, wherein the output circuitry is configured to output the data indicative of the selected region when the priority rating associated with the selected region has a higher priority or a same priority as a threshold priority rating.

8. The data processing apparatus according to claim 3, wherein the data output by the output circuitry is indicative of the selected region and the priority rating assigned to the selected region.

9. The data processing apparatus according to claim 1, wherein the selection circuitry is configured to select a region of the virtual environment in dependence upon whether a number of the respective viewpoints corresponding to the region satisfies a threshold condition for region selection.

10. The data processing apparatus according to claim 1, wherein the selection circuitry is configured to assign, to each respective viewpoint, one or more classifications from a plurality of classifications in dependence upon spectator data associated with the plurality of spectators.

11. The data processing apparatus according to claim 10, wherein the selection circuitry is configured to select a region of the virtual environment in dependence upon whether a number of the respective viewpoints corresponding to the region and having a same classification satisfies a threshold condition for region selection.

12. The data processing apparatus according to claim 10, wherein the selection circuitry is configured to calculate a value for a region of the virtual environment in dependence upon the respective viewpoints corresponding to the region, wherein the selection circuitry is configured to assign a weighting parameter to at least one of the respective viewpoints corresponding to the region in dependence upon a classification assigned to the respective viewpoint, and wherein the selection circuitry is configured to select the region of the virtual environment in dependence upon whether the value for the region exceeds a threshold value for a threshold amount of time.

13. The data processing apparatus according to claim 1, wherein the data output by the output circuitry is indicative of one or more regions of a two-dimensional map for visually representing the virtual environment.

14. The data processing apparatus according to claim 1, wherein the viewpoint data for a spectator is indicative of a position and orientation of the viewpoint for the spectator with respect to the virtual environment.

15. The data processing apparatus according to claim 14, wherein the detection circuitry is configured to detect a portion of the virtual environment viewed by a respective viewpoint in dependence upon the position and orientation of the viewpoint and a field of view associated with the viewpoint.

16. The data processing apparatus according to claim 14, wherein at least one of the position and orientation of the viewpoint is updated responsive to a control data output by an input device associated with the spectator.

17. The data processing apparatus according to claim 16, wherein the input device is a head-mountable display (HMD) to output one or more images of the virtual environment for display to the spectator, and wherein the viewpoint data comprises gaze data for the spectator indicative of a gaze point for the spectator with respect to the virtual reality environment.

18. A system comprising:
a server comprising a data processing apparatus, the data processing apparatus including:
(i) input circuitry to receive viewpoint data indicative of respective viewpoints for a plurality of spectators of a virtual environment,
(ii) detection circuitry to detect a portion of the virtual environment viewed by each of the respective viewpoints in dependence upon the viewpoint data, wherein one or more of the respective viewpoints are a static or dynamic view of one or more parts of an in-game virtual environment,
(iii) selection circuitry to select one or more regions of the virtual environment in dependence upon at least some of the detected portions, and
(iv) output circuitry to output data indicative of one or more of the selected regions; and
a plurality of user devices associated with the plurality of spectators of the virtual environment, wherein the output circuitry is configured to output the data indicative of one or more of the selected regions to one or more of the user devices.

19. A data processing method, comprising:
receiving viewpoint data indicative of respective viewpoints for a plurality of spectators of a virtual environment;
detecting a portion of the virtual environment viewed by each of the respective viewpoints in dependence upon the viewpoint data, wherein one or more of the respective viewpoints are a static or dynamic view of one or more parts of an in-game virtual environment;
selecting one or more regions of the virtual environment in dependence upon at least some of the detected portions; and
outputting data indicative of one or more of the selected regions.

20. A non-transitory, computer readable storage medium containing computer software which, when executed by a computer, causes the computer to perform a data processing method, by carrying out actions, comprising:
receiving viewpoint data indicative of respective viewpoints for a plurality of spectators of a virtual environment;
detecting a portion of the virtual environment viewed by each of the respective viewpoints in dependence upon the viewpoint data, wherein one or more of the respective viewpoints are a static or dynamic view of one or more parts of an in-game virtual environment;
selecting one or more regions of the virtual environment in dependence upon at least some of the detected portions; and
outputting data indicative of one or more of the selected regions.

* * * * *